United States Patent Office 3,376,296
Patented Apr. 2, 1968

3,376,296
ORTHO-NITROBENZOIC ACID, 5-NITROFUR-FURYLIDENE HYDRAZIDE
Harold E. Van Essen, Jr., and Robert R. Baron, Charles City, Iowa, assignors to Salsbury Laboratories, a corporation of Iowa
No Drawing. Original application Dec. 17, 1965, Ser. No. 514,678, now Patent No. 3,330,724, dated July 11, 1967. Divided and this application Apr. 7, 1967, Ser. No. 629,108
1 Claim. (Cl. 260—240)

ABSTRACT OF THE DISCLOSURE

The new chemical compound o-nitrobenzoic acid, 5-nitrofurfurylidene hydrazide of the formula

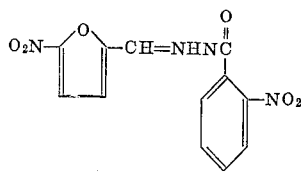

having valuable properties in the control and treatment of poultry coccidiosis.

Cross reference related

This application is a division of copending application S.N. 514,678, filed Dec. 17, 1965, now U.S. Patent 3,330,724, issued July 11, 1967.

This invention relates to a new heterocyclic compound of the furan series, and more particularly to a 5-nitrofuraldehyde in which the carbonyl oxygen is replaced by an ortho-nitrobenzoylhydrazone. The new compound which has been the empirical formula $C_{12}H_8N_4O_6$ and a molecular weight of 304.228 has the following structure

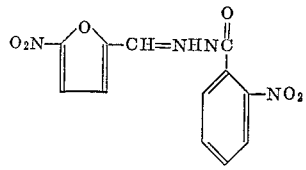

The new compound is a solid, odorless substance of yellow color and has a melting point of 200-202° C.

It is soluble in alkaline media and in view of its slightly acidic nature forms water-soluble salts analogous to a number of sulfa drugs wherein the hydrogen of the nitrogen atom adjacent to the carbonyl group may be replaced by a number of alkaline metals and ammonium.

On analysis the new compound was found to contain:

Carbon, 47.38% (calculated value 46.88%)
Hydrogen, 2.65% (calculated value 2.60%)
Nitrogen, 18.41% (calculated value 18.26%)

The compound may be prepared by interaction of o-nitrobenzhydrazide and a 5-nitrofurfurylidene derivative whose carbonyl group is reactive with the hydrazine moiety thereof. Such derivatives of 5-nitrofuran are, for example, 5-nitrofurfural, its acetals or lower acylals.

Among the lower acylals of 5-nitrofurfural its diacetate is especially suitable for the synthesis of the new compound. Its formation from 5-nitrofurfurylidene diacetate and o-nitrobenzhydrazide proceeds in accordance with the following equation:

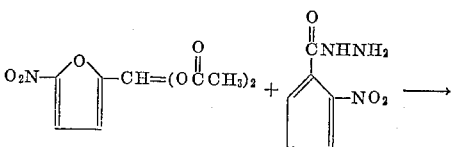

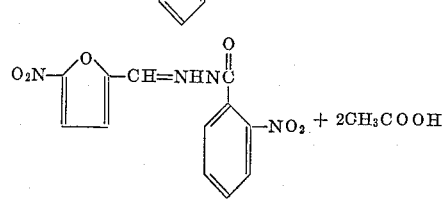

The following example will serve as an illustration of the preparation of the new compound:

Example 1.—o-Nitrobenzoic acid, 5-nitrofurfurylidene hydrazide 25 grams (0.13 mole) of o-nitrobenzhydrazide were refluxed for two hours with 33.5 grams (0.138 mole) of 5-nitrofurfurylidenediacetate in the presence of 500 ml. of denatured ethanol, 11 ml. of water and 11 ml. of sulfuric acid. The mixture was cooled and filtered and the resulting condensate was washed free of acid with denatured ethanol in water. The material was dried at 110° C. and the final product was obtained in a yield of 39 grams (92.9%). Its melting point was determined at 200-202° C.

As described in the copending application S.N. 514,678, filed Dec. 17, 1965, now U.S. Patent 3,330,724, issued July 11, 1967, the new compound and its water soluble salts have unique and valuable therapeutic properties in the control and treatment of poultry coccidiosis.

What we claim is:
1. Ortho-nitrobenzoic acid, 5-nitrofurfurylidene hydrazide represented by the formula:

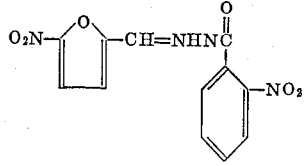

and its water-soluble alkaline metal and ammonium salts.

References Cited

UNITED STATES PATENTS
3,290,213  12/1966  Carron _____ 260—240 XR

FOREIGN PATENTS
649,734  7/1964  Belgium.

OTHER REFERENCES
Stradins et al.: Latviajas PSR Zinatnu Akad. Vestis, 1958, No. 1, pp. 113 to 120.
Zajdela et al.: Unio Intern. Contra Cancrum, Acta vol. 20 (1–2), pp. 233 to 239 (1964).

JOHN D. RANDOLPH, *Primary Examiner.*